April 22, 1924.

O. F. WARHUS

UNIVERSAL JOINT

Filed April 6, 1921

Inventor
OLIVER F. WARHUS

By

Patented Apr. 22, 1924.

1,491,763

UNITED STATES PATENT OFFICE.

OLIVER F. WARHUS, OF PHILADELPHIA, PENNSYLVANIA.

UNIVERSAL JOINT.

Application filed April 6, 1921. Serial No. 459,023.

*To all whom it may concern:*

Be it known that I, OLIVER F. WARHUS, a citizen of the United States, residing at Philadelphia, in the county of Philadelphia and State of Pennsylvania, have invented certain new and useful Improvements in Universal Joints, of which the following is a specification.

This invention relates to universal joints, and it comprises a yoke or socket member, a spherical head or ball adapted to be received therein, said head being provided with a peripheral groove, a key adapted to be arranged in said groove, said key being provided with offsets, said yoke being provided with a pair of slots adapted to receive said offsets, and a sleeve secured to the ball member of the joint and engaging the socket member to retain the parts in position.

In the present invention, I have provided a universal joint, wherein the ball and socket members are held in engagement with each other by means of a single key which is provided with a substantially semi-circular body portion adapted to be received in a groove in the ball member. The two ends of the key are offset in substantially the same plane, and are adapted to be received in slots formed in the socket member. The construction provides a hinged connection between the ball and socket members, the offset portions serving as the pintle of the hinge and the body portion connecting the ball member thereto.

The parts are surrounded by a sleeve which is secured to the ball member in any suitable manner, the outer end of the sleeve being curved inwardly to prevent longitudinal displacement of the parts. By means of this construction, a dust proof chamber is provided within the sleeve wherein a suitable lubricant may be placed and the lubricant is continually forced toward the key member when the parts are revolving, due to the change in size of the chamber.

By means of the sleeve surrounding the joint, the parts may be adjusted to take up wear and maintained in proper working relation.

Use of the construction comprising a single key member to connect the ball and socket, and a single surrounding sleeve eliminates the necessity of special machine work in the manufacture of parts and permits the device to be made cheaply on a commercial scale.

Figure 1:
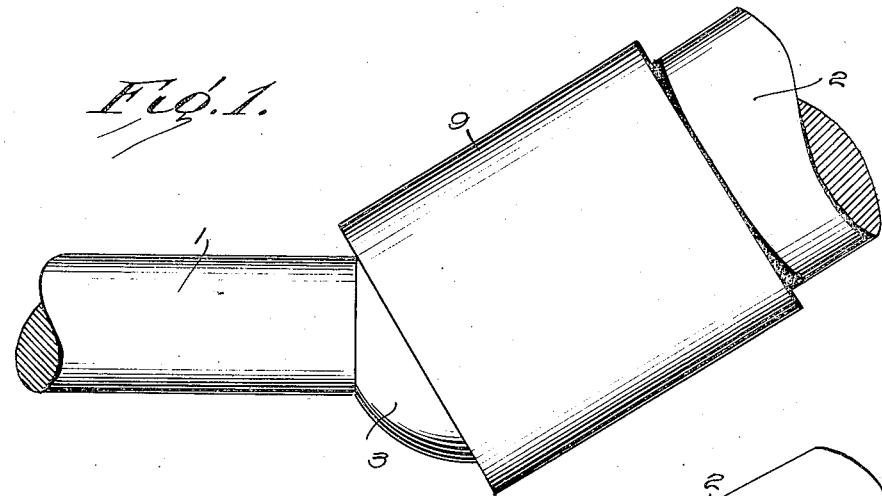
Figure 2:
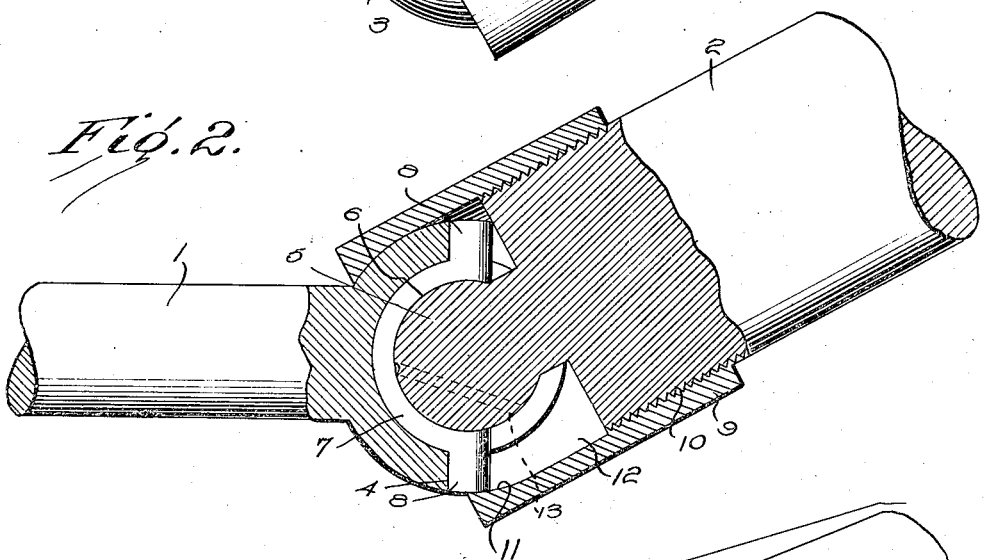
Figure 3:
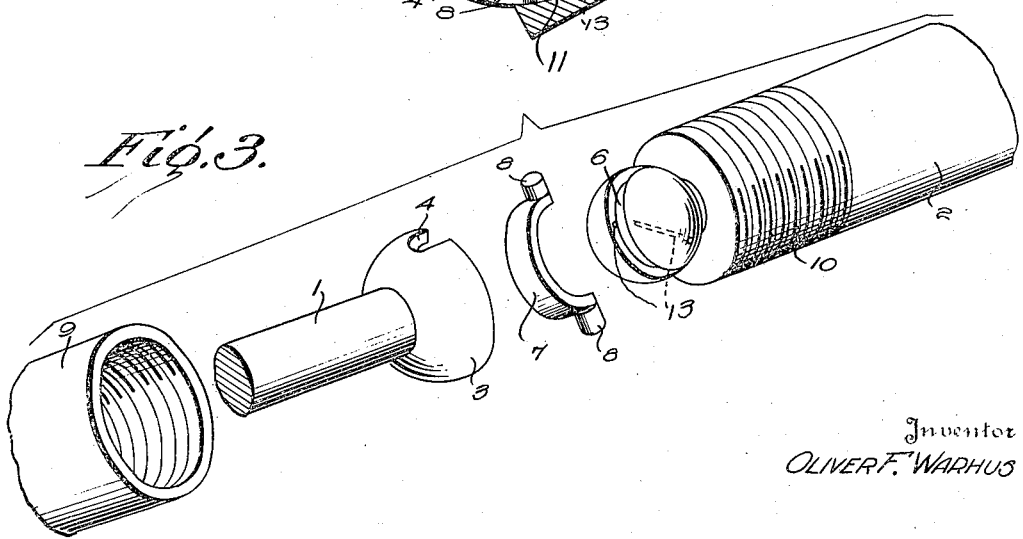

In the accompanying drawings, I have shown one embodiment of the invention. In this showing:

Figure 1 is an elevation, Figure 2 is a similar view, parts being shown in section, and,
Figure 3 is a detail perspective view of the parts disassembled.

Referring to the drawings, the reference numerals 1 and 2 designate a pair of shafts to be connected to each other. One of the shafts is provided with a substantially semi-circular yoke or socket member 3, having a pair of oppositely disposed slots 4, formed near its outer edge. The socket member may be formed integral with one of the shafts or may be connected thereto in any suitable manner. The other shaft is provided with a ball member 5, which may be secured thereto in any suitable manner, and which is provided with a peripheral groove 6. A key, comprising a substantially semi-circular body portion 7 is adapted to be secured in the groove. The key is provided with oppositely disposed offset ends 8, adapted to be arranged in the slots of the socket member.

A sleeve 9 is arranged on the end of the shaft carrying the ball member, and is secured thereto in any suitable way. As shown, the shaft may be provided with threads 10, adapted to engage internal threads formed on the sleeve. Any other suitable manner of securing the parts may be employed, such as bolts, set screws, keys or registering tongues and grooves. The interior opening of the sleeve is of uniform diameter throughout the greatest portion of its length, but is reduced at one end, as at 11, to prevent displacement of the parts. By reference to Figure 2 of the drawings, it will be seen that the diameter of the opening in the outer end of the sleeve is less than the diameter of the socket member, whereby displacement of the socket member is prevented. A lubricating chamber 12 is formed around the joint by the sleeve member, and the bolt member 5 is provided with grooves 13, extending from the lubricating chamber to the groove 6.

When the joint is to be assembled, the ball and socket are brought together with the body portion of the key arranged in the groove 6, and the ends 8 in the slots 4. It will be seen that the parts are thus engaged to rotate together. Relative longitudinal movement of the parts is prevented by the sleeve 9, which is inserted over the socket member and secured to the sleeve by the threads or other suitable means. If the parts become loose due to wear or other causes, they may be tightened by adjusting the sleeve inwardly on the shaft of the ball member. When the shafts are arranged at an angle, it will be apparent that different portions of the shaft and sleeve will continually assume the position wherein the greatest space is provided between the end of the socket member and the shaft carrying the sleeve, and as this part of the shaft moves from this position, the lubricant will be forced into the grooves 13 to the groove 6, thus lubricating the key way, by forced lubrication. Dust, dirt, and other foreign matter are excluded from the joint by the sleeve.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A universal joint comprising a shaft provided with a reduced end having a ball member thereon, said ball member being provided with a peripheral groove, a socket member adapted to receive said ball member, said socket member having substantially hemispherical inner and outer surfaces and being provided in its end with a pair of diametrically opposite slots, a substantially semicylindrical key mounted in said groove and having at its ends a pair of outstanding diametrical trunnions mounted in said slots, the outer ends of said trunnions being flush with and forming a substantial continuation of the outer surfaces of said socket member, and a sleeve carried by said shaft and surrounding said socket member, the outer end of said sleeve projecting beyond the center of said socket and having an internal shape whereby it is adapted to receive and contact with the outer surface of said socket member and the ends of said trunnions, the space between said shaft and the end of said socket member forming a lubricant chamber enclosed by said sleeve.

2. A universal joint, comprising a shaft provided with a reduced end having a ball member thereon, said ball member being provided with a peripheral groove, a socket member adapted to receive said ball member, said socket member having substantially hemispherical inner and outer surfaces and being provided in its end with a pair of diametrically opposite slots, a substantially semicylindrical key mounted in said groove and having at its ends a pair of outstanding diametrical trunnions mounted in said slots, the outer ends of said trunnions being flush with and forming a substantial continuation of the outer surfaces of said socket member, and a sleeve carried by said shaft and surrounding said socket member, the outer end of said sleeve projecting beyond the center of said socket and having an internal shape whereby it is adapted to receive and contact with the outer surface of said socket member and the ends of said trunnions, the space between said shaft and the end of said socket member forming a lubricant chamber enclosed by said sleeve, said ball member being provided with an opening communicating between said chamber and said groove.

In testimony whereof I affix my signature.

OLIVER F. WARHUS.